CRYOGENIC M OUT OF N LOGIC CIRCUITS

Filed Dec. 4, 1961 2 Sheets-Sheet 1

BY

INVENTOR.
R. R. SEEBER, Jr.

Roy C. Hopgood

ATTORNEY

INVENTOR.
R. R. SEEBER, Jr.

BY

Roy C. Hopgood
ATTORNEY

United States Patent Office
3,238,377
Patented Mar. 1, 1966

3,238,377
CRYOGENIC M OUT OF N LOGIC CIRCUITS
Robert R. Seeber, Jr., Poughkeepsie, N.Y., assignor to International Business Machines Corporation, New York, N.Y., a corporation of New York
Filed Dec. 4, 1961, Ser. No. 156,807
10 Claims. (Cl. 307—88.5)

This invention relates in general to cryogenic logic circuits and in particular to the storage and processing of information represented therein by an M out of N code. The invention is characterized by the application of M out of N codes to cryogenic logic circuits such as storage circuits and decimal full adders or the like. The invention is applicable to any cryogenic logic circuit which can be adapted to use an M out of N code.

Many cryogenic logic circuits have been devised in the past to utilize the phenomena of superconductivity as a means of storing and processing information. In these circuits, a plurality of branches or closed loops of superconductive material are maintained in a superconductive state by means of refrigeration, and persistent currents are established in the branches or loops in accordance with a code representing units of information. Once established, these persistent currents will remain indefinitely without application of electrical energy as long as the device remains superconductive, i.e. as long as its temperature is held below a predetermined level.

These prior art cryogenic logic circuits provided means for storing binary information in superconductive loops by either selectively storing current in one direction to represent a binary one and in the other direction to represent a binary zero, or by allowing the presence of persistent current in the loop to represent a binary one and the absence of a persistent current to represent a binary zero. Regardless of the particular representation used, however, these prior art devices required two super conductors for each binary bit. Since 4 binary bits are required to represent a decimal digit in the binary number system, these prior art storage devices required 8 superconductors and their associated circuit components to store a single decimal digit.

In accordance with this invention, however, it has been discovered that a significant reduction in components can be achieved by storing and processing the information in an M out of N code rather than in the binary number code. For example, a decimal digit can be stored in 5 superconductors when it is represented in a 2 out of 5 (2/5) code, as compared to the 8 superconductors required to store the digit when it is represented in the binary number code. To illustrate this reduction of components, the decimal digits 0 through 9 are listed in Chart 1 below alongside of their equivalent in a cryogenic binary coded register and in a cryogenic M out of N register which utilizes a common 2/5 code.

CHART I.—REPRESENTATION OF DECIMAL DIGITS IN CRYOGENIC STORAGE REGISTERS.

[The columns designate superconductors. The presence of current in a superconductor is indicated by a 1 in the corresponding column and the absence of current is indicated by a 0.]

| Decimal Digit | Binary Coded Register | | | | | | | | 2/5 Coded Register | | | | |
|---|---|---|---|---|---|---|---|---|---|---|---|---|---|
| | $P'_8$ | $P_8$ | $P'_4$ | $P_4$ | $P'_2$ | $P_2$ | $P'_1$ | $P_1$ | $P_7$ | $P_4$ | $P_2$ | $P_1$ | $P_0$ |
| 0 | 1 | 0 | 1 | 0 | 1 | 0 | 1 | 0 | 1 | 1 | 0 | 0 | 0 |
| 1 | 1 | 0 | 1 | 0 | 1 | 0 | 0 | 1 | 0 | 0 | 0 | 1 | 1 |
| 2 | 1 | 0 | 1 | 0 | 0 | 1 | 1 | 0 | 0 | 0 | 1 | 0 | 1 |
| 3 | 1 | 0 | 1 | 0 | 0 | 1 | 0 | 1 | 0 | 0 | 1 | 1 | 0 |
| 4 | 1 | 0 | 0 | 1 | 1 | 0 | 1 | 0 | 0 | 1 | 0 | 0 | 1 |
| 5 | 1 | 0 | 0 | 1 | 1 | 0 | 0 | 1 | 0 | 1 | 0 | 1 | 0 |
| 6 | 1 | 0 | 0 | 1 | 0 | 1 | 1 | 0 | 0 | 1 | 1 | 0 | 0 |
| 7 | 1 | 0 | 0 | 1 | 0 | 1 | 0 | 1 | 1 | 0 | 0 | 0 | 1 |
| 8 | 0 | 1 | 1 | 0 | 1 | 0 | 1 | 0 | 1 | 0 | 0 | 1 | 0 |
| 9 | 0 | 1 | 1 | 0 | 1 | 0 | 0 | 1 | 1 | 0 | 1 | 0 | 0 |

As shown in Chart I, the binary coded register requires a pair of superconductors for each binary bit. The unprimed member ($P_1 \ldots P_8$) of each superconductor pair is used to represent a binary bit, and the primed member ($P'_1 \ldots P'_8$) of each superconductor pair provides a path for the persistent current when the corresponding unprimed member is in its binary zero state, which is indicated by the absence of current therein. The binary coded register thus requires 8 superconductors to represent the decimal digits 0 . . . 9. In the 2/5 coded register, however, the same decimal digits are represented by a total persistent current of 2 units which is routed through 2 out of the 5 superconductors in the register. It can be seen, then, that the 2/5 coded register provides a 37.5% reduction in superconductors and their associated current switching devices. This same reduction, of course, is also present in the input means used to enter information into the register and the output means used to extract or process information stored in the register.

This invention does not reside in the use of M out of N codes per se, which are well known in the art, but rather in a novel means of adapting cryogenic circuits to utilize M out of N codes and more particularly in novel information transfer means which makes it possible to use M out of N codes in cryogenic logic circuits.

Accordingly, one object of this invention is to provide information transfer means by which M out of N codes can be utilized in cryogenic logic circuits.

Another object of this invention is to provide cryogenic logic circuits which are simpler in structure than those heretofore known in the art.

Another object of this invention is to provide cryogenic means for storing and processing information represented by an M out of N code.

A further object of this invention is to provide a cryogenic M out of N decimal storage circuit.

Another object of this invention is to provide a cryogenic M out of N code translator which is adapted to convert information from one M out of N code to another M out of N code.

An additional object of this invention is to provide a cryogenic M out of N decimal full adder.

Other objects and advantages of the invention will be apparent to those skilled in the art from the following description of several specific embodiments thereof, as illustrated in the attached drawings, in which.

This invention is similar to the prior art devices in that it utilizes superconductor persistent current devices for storing and processing information. The invention differs from the prior art, however, first in representing the information in an M out of N code, and second in employing novel means for entering information into the circuit, for storing the information, and for processing the information stored therein. Before discussing the novel structure of this invention, however, it will be convenient to review the major structural elements which are used in the novel circuits of this invention. These structural elements comprise prior art superconductors, prior art cryogenic current sources, prior art cryotrons, and cryogenic current limiting devices.

It is, of course, now well established that closed loops or branches of superconductor material are capable of having currents stored therein which will persist indefinitely without the application of electrical energy as long as the material is maintained at a low enough temperature. Briefly, such devices operate by virtue of the fact that it is not possible to change the net flux threading a loop of superconductive material without introducing resistance into the loop. Therefore, if a loop of superconductive material is allowed to become superconductive when there is a net flux threading the loop, a persistent current will be established in the loop to maintain this net flux constant. Once established in such a loop, the current will persist as long as the entire loop remains superconductive. Examples of devices which utilize this phenomena are found in copending applications Serial Number 31,940, now Patent Number 3,093,816, filed on May 26, 1960, in behalf of L. P. Hunter, Serial Number 615,-814, filed on October 15, 1956, in behalf of R. L. Garwin and Serial Number 861,392, now Patent Number 3,191,-159, filed on December 22, 1959, in behalf of R. D. Young, all of which are assigned to the assignee of the subject application.

Figure 1A:
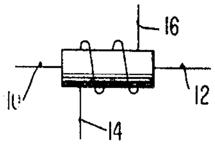
FIG. 1A is a schematic representation of a prior art cryotron.
Figure 1B:
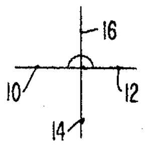
FIG. 1B is a block diagram symbol which is used in FIGS. 3, 4 and 5 to represent a prior art cryotron.
Figure 4:
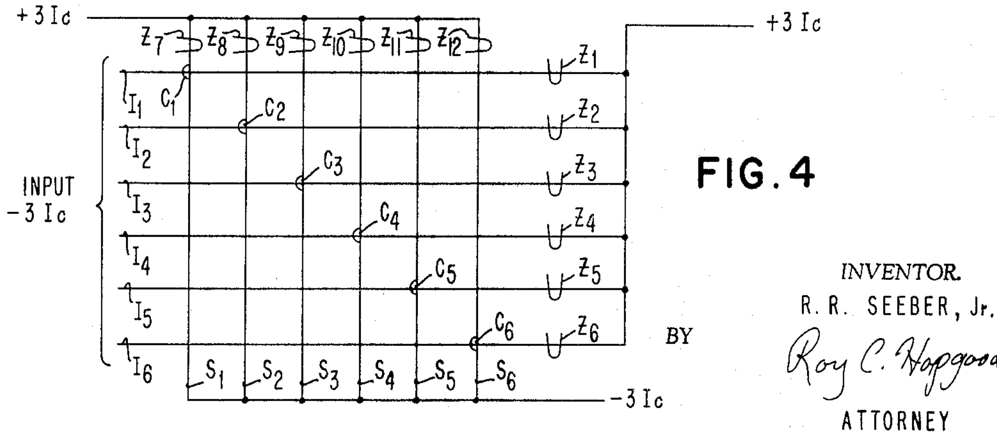
FIG. 4 is a block diagram of a second M out of N storage circuit of this invention.
Figure 5:
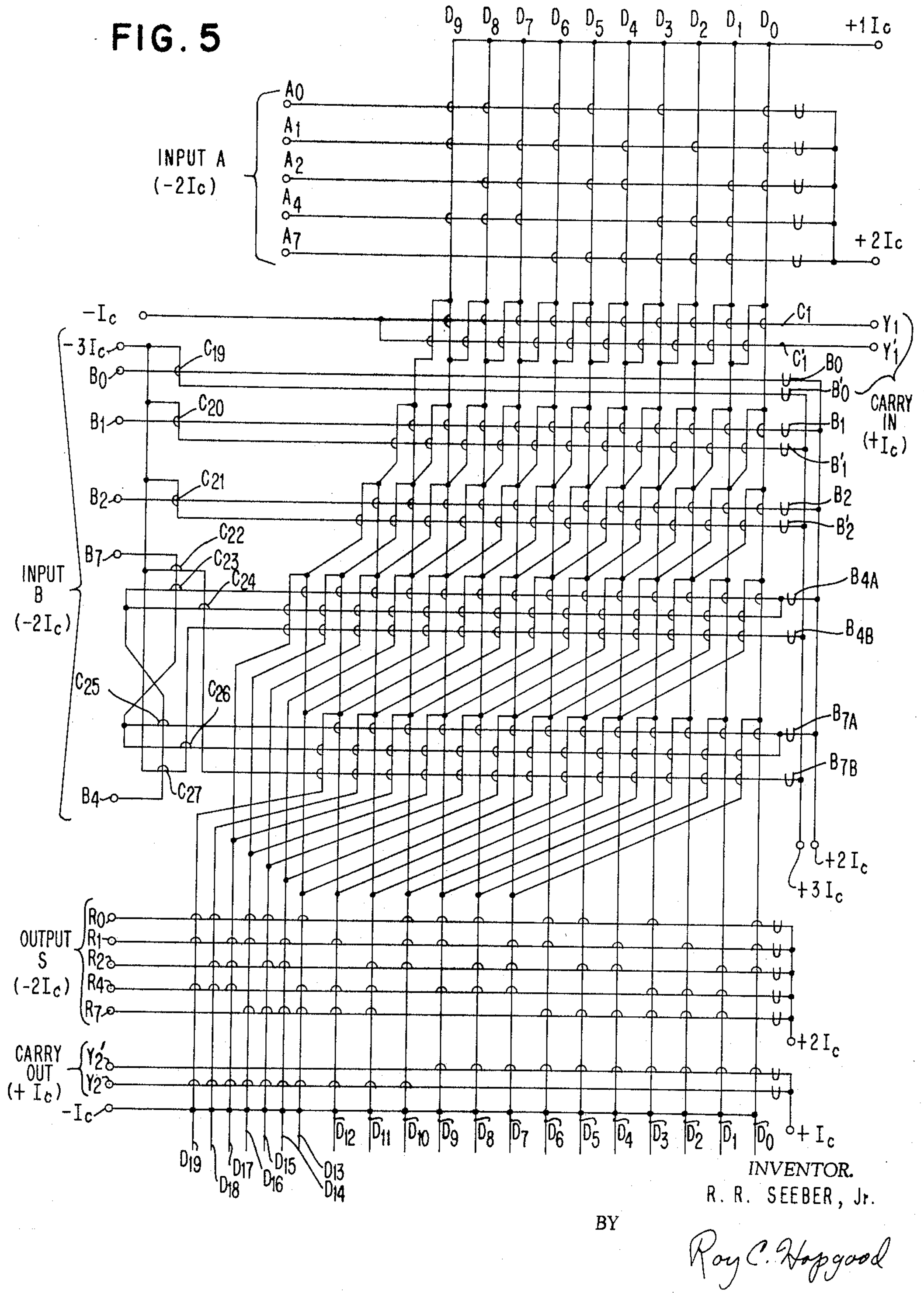
FIG. 5 is a block diagram of one illustrative M out of N full decimal adder of this invention which contains a third M out of N storage circuit of this invention.

These copending applications disclose means for establishing currents in superconductive loops or branches and for switching the currents or detecting the presence thereof by a cryotron such as shown in FIG. 1A of this application. The cryotron is a prior art superconductor device which contains two gate conductors (10 and 12) and two control conductors (14 and 16). When the current flowing between the two control conductors is below a predetermined level, a superconductive current path exists between the two gate conductors, but when the control current exceeds the predetermined level, the current path between the gate conductors becomes resistive. These cryotrons, which can be designed to switch to their resistive stage at any desired level of control current, are represented in FIGS. 3, 4 and 5 of the drawings by the block diagram symbol shown in FIG. 1B.

Figure 2A:
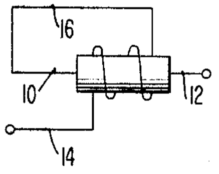
FIG. 2A is a schematic symbol of a cryogenic current limiting device formed from the cryotron of FIG. 1A.
Figure 2B:
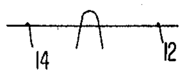
FIG. 2B is a block diagram symbol which is used in FIGS. 3, 4 and 5 to represent a cryogenic current limiting device.

In addition to the superconductor loops or branches, superconductor current sources, and prior art cryotrons as described in the above noted copending applications, the novel structure of this invention also contains two-terminal cryogenic current limiting devices which become resistive whenever the current therethrough exceeds a predetermined value. These devices can be made in the form of a cryogenic element whose geometry and/or material is such that it will become resistive due to self-field when the current therethrough exceeds a predetermined limit, or they can be made by coupling a prior art cryotron back on itself as shown in FIG. 2A, where control conductor 16 is coupled to gate conductor 10, and where control conductor 14 and gate conductor 12 form the input and output conductors of the device. Cryogenic current limiting devices of either of these two types, or any other type, are represented in FIGS. 3, 4 and 5 of the drawings by the block diagram symbol shown in FIG. 2B. It should be understood that the cryotron devices described above may be provided in any known form, as for example, wire-wound devices in which the control conductors include a coil wound around the gate conductors, or thin film devices wherein the gate and control conductors consist of films deposited upon a substrate.

Figure 3:
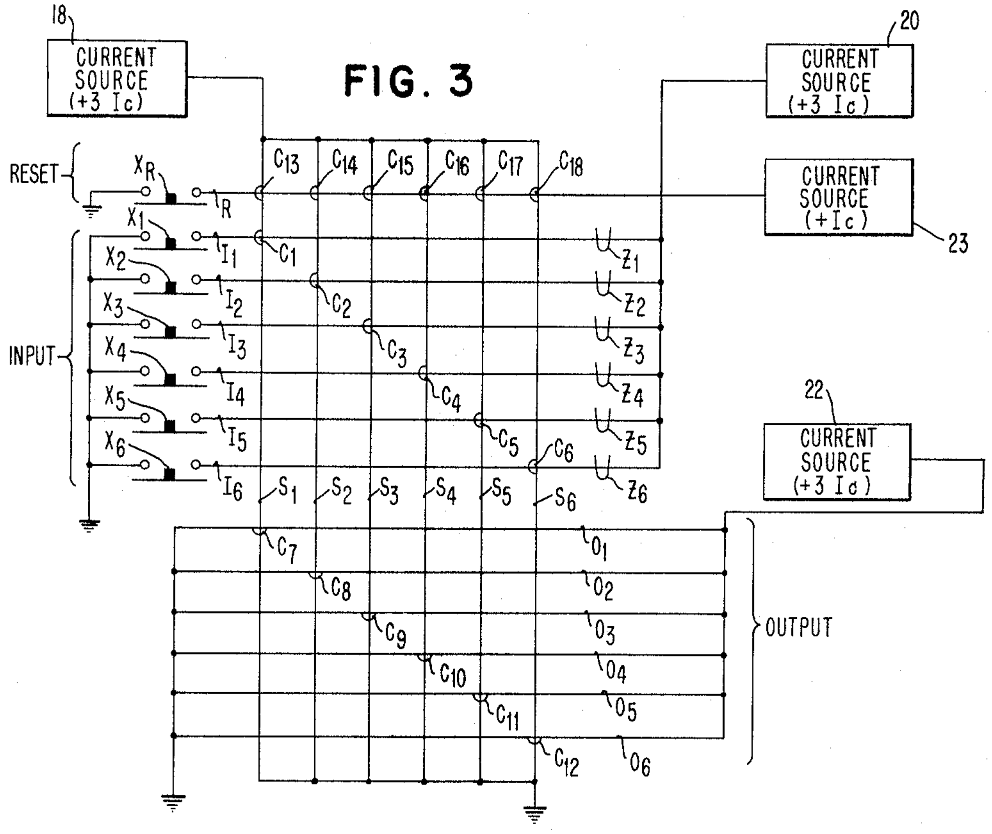
FIG. 3 is a block diagram of one illustrative M out of N storage circuit of this invention.

FIG. 3 shows one illustrative way of coupling the above described structural elements together to form a storage device that is adapted to receive and to store binary information represented in a three out of six (3/6) code. The storage elements of this device comprise superconductor branches $S_1 \ldots S_6$, which are coupled together in parallel and which are fed from a common current source 18. Each of the superconductor branches $S_1$ through $S_6$ has the same inductance so that the current from current source 18 will divide equally between each branch in the absence of any resistance in the branch. This is accomplished either by fabricating the superconductor branches with conductors having the same cross sectional geometry and making the branches of equal length, or by adjusting the cross sectional geometry of the conductors to compensate for any difference in the length thereof. Each of the superconductor branches $S_1 \ldots S_6$ is coupled in series with the gate conductor of a corresponding input cryotron $C_1 \ldots C_6$ and also in series with the control conductors of a corresponding output cryotron $C_7 \ldots C_{12}$. The control conductors of input cryotrons $C_1 \ldots C_6$ are coupled in series with a set of input superconductor branches $I_1 \ldots I_6$, and the gate conductors of output cryotrons $C_7 \ldots C_{12}$ are coupled in series with a set of output superconductor branches $O_1 \ldots O_6$. Superconductor branches $I_1 \ldots I_6$, which are also equal in inductance value, are coupled in parallel to a second common current source 20. In the same manner, the output superconductor branches $O_1 \ldots O_6$ are coupled in parallel to a third common current source 22. Each of the current sources 18, 20 and 22 is adapted to provide an output current of $+3I_C$ where $I_C$ is the amount of control current required to make one of the corresponding cryotrons resistive. The current from input current source 20 is divided into three branch currents each equal in value to $+I_C$ by means of cryogenic current limiters $Z_1 \ldots Z_6$, each of which is adapted to become resistive at a current flow of $+I_C$. The current from storage current source 18 is also divided into three parallel branches due to the action of the input circuit, as described below.

When binary information is entered into the circuit of FIG. 3, a current of $I_C$ is established on three of the six input lines $I_1 \ldots I_6$ in accordance with a 3/6 code representation of the information. This can be done, for example, by closing three of six normally open relay contacts $X_1 \ldots X_6$ or by any other suitable switching circuit, as will be apparent to those skilled in the art. When the three relay contacts close, a current of $+I_C$ will be established on each of the corresponding input superconductor branches, which will make the corresponding storage superconductors resistive through the action of the input cryotrons. Assuming that steps have been taken to prevent unbalance caused by a prior operation of the circuit as will be explained later, the current from storage current source 18 will divide equally through the non-resistive storage superconductors, thus establishing a binary 1 on those branches, while no current will flow through the resistive storage superconductors, thereby establishing a binary 0 on those branches. This distribution of current in storage conductors $S_1 \ldots S_6$ will persist after current flow on input conductors $I_1 \ldots I_6$ has been switched off, thereby storing the input information on the storage conductors. It will be noted by those skilled in the art that the information stored on conductors $S_1 \ldots S_6$ is the complement of the information introduced into the device on input conductors $I_1 \ldots I_6$. The information is, however, complemented again in the output circuit, which thus returns it to its original form.

The output circuit is similar to the input circuit and works in exactly the same manner. Current flow through three of the storage conductors $S_1 \ldots S_6$ makes three of the output conductors resistive, whereby the current from output current source 22 will divide between the three output branches in accordance with the input information. The complete output circuit is not shown, but it will be apparent to those skilled in the art that output conductors $O_1 \ldots O_6$ will be coupled to a cryogenic ouptut device or to the input of another cryogenic M out of N logic circuit. In the latter case, the output current source 22 of one logic circuit would comprise the input current source 20 of the succeeding logic circuit. Thus, when the logic circuit of FIG. 3 is connected in cascade with other logic circuits of the same type, it is only necessary to use two current sources per stage instead of three. In other applications of the invention, however, it may be necessary to provide a separate output current source 22 such as shown in FIG. 3.

In addition to providing means for entering the desired information into the storage conductors $S_1 \ldots S_6$, it is also necessary to provide means for changing the information from one specific code combination to another. The above described input conductors, storage conductors, and cryotrons coupled thereinbetween are not adequate in themselves to insure the proper switching from one 3/6 code combination to another. For example, assume that input currents were applied to input conductors $I_1$, $I_2$ and $I_3$ so that persistent currents of $I_C$ were established on each of the storage conductors $S_4$, $S_5$ and $S_6$. After establishment of these persistent currents, cryotrons $C_1$–$C_6$ may be deactivated, as by turning off current source 20 or by opening all of switches $X_{1-6}$. The currents $I_C$ will continue to flow only through conductors $S_4$, $S_5$ and $S_6$ even though all branches are superconductive. If it is desired to subsequently switch to a different code combination in which persistent currents are present on storage conductors $S_2$, $S_5$ and $S_6$, a serious problem is presented. It is not sufficient to simply activate cryotrons $C_1$, $C_3$ and $C_4$ since there is no way of switching all of the current from storage conductor $S_4$ into storage conductor $S_2$. When a resistance is introduced into storage conductor $S_4$, the current formerly flowing therethrough simply divides equally among the three non-resistive branches. This would produce a current of $\frac{1}{3}$ $I_C$ on storage branch $S_2$ and a current of $1\frac{1}{3}$ $I_C$ on storage branches $S_5$ and $S_6$. Therefore it is necessary to quench or balance all of the persistent current flow in the storage conductors $S_1$–$S_6$ before the information therein is changed. In the circuit of FIG. 3, this is done by means of a plurality of reset cryotrons $C_{13} \ldots C_{18}$, whose control conductors are coupled in series with a common reset superconductor R. Each of the reset cryotrons $C_{13} \ldots C_{18}$ has its gate conductors coupled in series with a corresponding storage conductor $S_1$ through $S_6$ so that all of the persistent current in the storage branches can be quenched by passing a current of $I_C$ through reset conductor R. Source 18 may be deactivataed while the conductor R is energized, but this is not essential. If source 18 is left on, the current therefrom will divide equally between the six resistive branches S1–S6 (assuming that the resistances are equal). The new combination of input currents can then be switched on, and when the reset current is switched off, the current from current source 18 will divide in accordance with the new input combination to represent the new information. Thus, in this particular embodiment of the invention, the information contained in the storage branches is changed by first energizing the reset conductor R, then energizing the selected three out of the six input conductors, then de-energizing the reset conductor to permit a new division of current from the source 18, and finally de-energizing the input conductors. The new information, of course, will persist until the reset conductor is energized again in preparation for another change of information.

In accordance with a second specific embodiment of this invention, which is shown in FIG. 4, the need for a reset conductor is circumvented by coupling cryogenic current limiting devices $Z_7$ through $Z_{12}$ in series with each of the storage conductor $S_1$ through $S_6$. These cryogenic current limiting devices are designed to become resistive when the current therethrough exceeds $I_C$, which means that the current flow through storage conductors $S_5$ and $S_6$ cannot rise to $1\frac{1}{3}$ $I_C$ when the input combination is changed, as they did in the example cited in connection with the circuit of FIG. 3, and therefore that all of the current would be switched from storage $S_4$ into storage conductor $S_2$ in the example cited above. Since the circuit arrangement shown in FIG. 4 does not require any reset, it is therefore highly preferable to the circuit shown in FIG. 3. Except for the replacement of the reset cryotrons with storage current limiters $Z_7$ through $Z_{12}$, the embodiment shown in FIG. 4 is otherwise identical to the input and storage portions of the embodiment shown in FIG. 3, although the current sources and switching means are indicated rather than shown in FIG. 4. It will be apparent to those skilled in the art, however, that $+31_C$ indicates a current source which produces a current of $31_C$, and that $-31_C$ indicates the return or ground connection to the corresponding current source.

The above described circuits illustrate the most basic feature of this invention, which comprises cryogenic means for transferring M out of N coded information from one set of superconductors to another. This basic information transfer means can be used throughout a cryogenic logic circuit to adapt the circuit for M out of N codes, which provide a substantial reduction in circuit components. The above described circuits also illustrate another important feature of this invention—an M out of N cryogenic storage register which is adapted to receive and to store M out of N coded information. The storage register which is adapted to receive and to store M out of N coded information. The storage register can also be used throughout cryogenic logic circuits to adapt the circuit for M out of N codes.

The basic circuits described above can be applied to many different cryogenic logic circuits. One illustrative aplication thereof is shown in FIG. 5, which discloses a cryogenic decimal full adder that is adapted to add together two decimal numbers which are represented in the particular 2/5 code shown in Chart I of this application. This circuit is adapted to receive two decimal input numbers A and B which are represented in a said 2/5 code, to add these two numbers together, and to produce an output signal R which represents the sum of the two numbers in the 2/5 code. This circuit is also adapted to add a carry input $Y_1$ to the two numbers, and to produce a carry output $Y_2$ if the sum of the two decimal numbers and the carry input is greater than 9. The M out of N storage portion of this circuit comprises the input conductors labeled $B_0$, $B_1$, $B_2$, $B_4$, and $B_7$, which correspond to the input conductors $I_1$ through $I_6$ disclosed in FIGS. 3 and 4, and storage conductors $B'_0$, $B'_1$, $B'_2$, $B'_4$, and $B'_7$, which correspond to the storage conductors $S_1$ through $S_6$ disclosed in FIGS. 3 and 4. This storage circuit differs from the circuit of FIG. 4 in that it is adapted for a 2/5 code instead of 3/6 code, which means that there will be 5 input conductors and 5 storage conductors rather than 6, and that the current source for the input conductors will be adapted to produce a current of $2I_C$ while the current source for the storage conductor will be adapted to produce a current of $3I_C$. The difference in the current values arises, of course, from the fact that the code input number is complemented when it is transferred from the input conductors to the storage conductors, and that the complement of a 2/5 code number is a 3/5 code number. In the circuit arrangements of FIGS. 3 and 4, the two current sources were equal by virtue of the fact that the complement of the 3/6 code number is also a 3/6 code number. The storage circuit shown in FIG. 5 also differs from those shown in FIGS. 3 and 4 in having an output circuit and in being adapted to interact with the addition circuits, as will be described in detail in later paragraphs.

All of the cryotrons shown in FIG. 5 are designed to become resistive when a current of $I_C$ is passed through their control conductors, and all of the cryogenic current limiting devices are adapted to become resistive when the current therethrough exceeds a common critical current $I_C$. It is not necessary to use a common critical current for all of the cryotrons, but it is preferable to do so to simplify the structure of the device. Only the cryotrons which are associated with the 2/5 storage portion of the circuit are identified by numbers; the remaining cryotrons will be identified in the description which follows by the two conductors that they join together. Thus cryotron ($A_0$–$D_6$) is the cryotron which is situated at the intersection of conductor $A_0$ and conductor $D_6$ on the drawing. The cryogenic current limiting devices will be identified by the conductor to which they are connected. Thus current limiter $B_0$ is the current limiter coupled in series with conductor $B_0$.

The decimal full adder shown in FIG. 5 is adapted to receive a 2/5 input coded digit A and 2/5 coded input digit B in accordance with the particular 2/5 code shown in Chart I of this application. Input digit A is applied to a plurality of input lines $A_0$, $A_1$, $A_2$, $A_4$ and $A_7$, where the subscripts on the input line corresponds to the column subscript designation shown in Chart I. Thus the decimal digit 5 is applied to the A input lines by placing a current of $I_C$ on input superconductors $A_1$ and $A_4$, which correspond respectively to columns $P_1$ and $P_4$ in Chart I. Input conductors $A_0$ through $A_7$ are coupled through a plurality of cryotrons to ten decimal storage superconductors $D_0$ through $D_9$. These cryotrons are arranged so as to decode input digit A from the 2/5 input code into a decimal code whereby a current of $I_C$ is established on one of the ten storage conductors $D_0$ through $D_9$ in accordance with the decimal digit represented by the 2/5 code applied to input conductors A. For example, when the 2/5 code for zero is applied to input conductors A, all of the storage conductors $D_0$ through $D_9$ will be rendered resistive except for conductor $D_0$. This can be seen by noting that current on input conductors $A_4$ and $A_7$ pass through the control conductors of one or more cryotrons on each of the storage conductors $D_0$ through $D_9$ except for storage conductor $D_0$. Therefore the current of $I_C$ which is applied in parallel to all of the storage conductors $D_0$ through $D_9$ will be forced down the $D_0$ storage conductor and it will persist in that conductor after the A input signal is removed. When the 2/5 input code for the decimal digit 6 is applied to input conductors A, current is driven down input conductors $A_2$ and $A_4$. Examination of the decoding matrix will show that current on conductors $A_2$ and $A_4$ will make every one of the storage conductors $D_0$ through $D_9$ resistive except for storage conductor $D_6$. Therefore the current will be switched down storage conductor $D_6$ whenever the code input for the decimal digit 6 is applied to input conductors A. In the same manner, the current will be switched down the decimal storage conductor corresponding to any of the other decimal digits represented in the 2/5 code. Thus the effect of a 2/5 coded input on input conductors A is to switch a current of $I_C$ onto the storage conductor D corresponding to the digit represented by the code.

If a carry input signal is applied to conductor $Y_1$ along with or subsequent to the application of input digit A, the current in storage conductor D will be shifted one conductor to the left through the joint action of the cryotrons coupled to carry input lines $Y_1$ and $Y'_1$. This shift to the left constitutes an addition by 1 to the decimal digit represented by input code A. Thus if input code A signifies the decimal digit 6, and a carry input signal is present, the current will be shifted from storage conductor $D_6$ to $D_7$ when it reaches the cryotrons coupled to carry input conductors $Y_1$ and $Y'_1$. It will be apparent from FIG. 5 that conductors $Y_1$ and $Y'_1$ must receive complementary input signals; i.e. when no current is applied to conductor $Y_1$ a current of $I_C$ must be applied to $Y'_1$ and vice versa. After passing through the carry input cryotrons, the decimal storage current passes through another addition network which branches out to increase the number of decimal storage lines up to $D_{19}$. It will be understood by those skilled in the art that twenty decimal storage conductors $D_0$ through $D_{19}$ are required to represent the sum of two decimal digits in a decimal code.

The cryotrons which are coupled to input conductors $B_0$ through $B_7$ and 2/5 storage conductors $B'_0$ through $B'_7$ act to shift the current in storage conductor D to the left by a number equal to the decimal equivalent of the 2/5 code input applied to input conductors $B_0$ through $B_7$. Thus current on conductor $B_1$ acts to shift the current to the left by one unit; current on the conductor $B_2$ acts to shift current to the left by two units; current on conductor $B_4$ acts to shift the current to the left by four units; and current on conductor $B_7$ acts to shift current to the left by seven units. (When $B_4$ and $B_7$ are energized simultaneously, however, there is no shift of current because this is the code representation for zero, as will be more fully explained in later paragraphs.) An examination of the 2/5 code in Chart I will show that each decimal digit represented in the code is equal to the sum of the subscripts on the columns which contain a binary 1 for that particular code entry. Thus when the code for the decimal digit 5 is applied to input conductors B, current will be shifted to the left by one unit due to the current in input line $B_1$ and then by four units to the left due to the current in line $B_4$ to produce a total shift of five units to the left. Therefore if the 2/5 code for the digit 6 is applied to input A and the 2/5 input code for the digit 5 is applied to input B, the current in the decimal storage conductors will be shifted onto conductor $D_{11}$, which represents the decimal digit 11. If a carry input signal had been applied along with the two input digits, then the current would be shifted onto the decimal storage line $D_{12}$. Therefore, the location of the current at the lower end of the addition tree will indicate the sum of the digits applied to input A and input B and the carry input. This indication is encoded back into the original 2/5 code in an output encoding matrix of cryotrons coupled to output conductors $R_0$ through $R_7$ and carry output conductors $Y_2$ and $Y'_2$. Output conductors $R_0$ through $R_7$ produce an output code indicating the unit digit of the output number and the carry output conductor indicates whether or not a ten digit is present in the output number. Thus the combination of the carry output and the R digit output will uniquely characterize any decimal number between zero and 19.

The above described decimal full adder circuit can be coupled in series with other adder circuits of the same type to form a serial adder, or it can be coupled in parallel with other adder circuits of the same type to form a parallel adder. In the parallel adder circuit, of course, the carry output of one adder stage would provide the carry input for next higher order digit in the overall circuit, except in the highest order and unit digit stages. In the serial adder circuit, the carry output would be stored in a flip-flop and fed back to the carry input conductors on the next cycle. These adaptations, however, will be obvious to those skilled in the art.

It will be noted in FIG. 5 that the input conductors $B_7$ and $B_4$ are interconnected by cryotrons C22 . . . C27 while the other B input conductors are not interconnected. This is due to the particular 2/5 code used in this embodiment of the invention. Since zero is represented in this code by simultaneous current on the $B_4$ and $B_7$ input conductors, the $B_4$ and $B_7$ input conductors have to be arranged so that there will be a shift to the left of four units when $B_4$ is energized by itself, and a shift to the left of seven units when $B_7$ is energized by itself, but no shift to the left when $B_4$ and $B_7$ are simultaneously energized to represent zero. This is accomplished by dividing input conductors $B_4$ and $B_7$ into two branches $B_{4A}$, $B_{4B}$, $B_{7A}$ and $B_{7B}$. When input current is simultaneously applied to conductors $B_4$ and $B_7$, the input current will be switched onto conductors $B_{4B}$ and $B_{7B}$ by cryotrons C22 . . . C27, whose action will be apparent to those skilled in the art. An examination of the cryotrons coupled to conductors $B_{4B}$ and $B_{7B}$ will show that currents on these conductors will not only be ineffective in shifting current on the decimal storage conductors, but that they will prevent any such shift by making the transfer conductors resistive. If, however, input current is applied to only one of the conductors $B_4$ or $B_7$, the input current will be routed down conductor $B_{4A}$ or $B_{7A}$, which will cause the desired shift of current to take place in the decimal storage conductors. This particular cross coupling of the input conductors can be adapted to fit any 2/5 code or any M out of N code in a straightforward manner which will be apparent to those skilled in the art. It is merely necessary to provide dummy conductors such as $B_{4B}$ and $B_{7B}$ for each conductor which is involved in the zero code representation, and then to provide a switching circuit whereby the input current is switched onto the dummy conductors whenever the zero code conductors are simultaneously energized so that no shifting will take place under those circumstances.

It should be noted that the input digits and carry input do not have to be applied simultaneously in the above described decimal full adder. They can be applied in serial order, if desired, providing that the carry input and digit A input both precede the digit B input. It should also be noted that the output indication will persist after the input currents have been quenched, but that the adder circuit does not have to be reset before a new pair of digits is entered therein. The application of a new input digit on input conductors A automatically erases any trace of the previous addition and completely clears the circuit. Thus the decimal full adder of this invention is self-resetting without requiring any reset circuits.

It should be noted that the decimal code used in decimal storage conductors $D_0 \ldots D_9$ is also an M out of N code; more specifically, it is a 1 out of 10 (1/10) code. Therefore it will be apparent that the M out of N transfer means of this invention and the M out of N storage register thereof are not limited to a single M out of N code. If desired, the information can be translated from one M out of N code into another M out of N code when it is transferred from one set of conductors to another. For example, the input digit A is translated from a 2/5 code to a 1/10 code when it is transferred from conductors $A_0 \ldots A_7$ to conductors $D_0 \ldots D_9$. In the addition tree circuit the 1/10 code is translated by steps into a 1/20 code, and in the output encoder the 1/20 code is translated into a 3/7 code. The 3/7 code, it should be noted, comprises the combination of a 2/5 code for the first digit of the output number and a 1/2 code for the second digit thereof. Since both digits are required to uniquely represent the output number, these individual codes must be considered as a single 3/7 code. Thus another important advantage of the basic information transfer means of this invention is that it can be easily adapted to serve as an M out of N code translator to convert information from one M out of N code to another.

Although this invention has been described in connection with specific embodiments thereof, it should be understood that the invention is by no means limited to the specific embodiments set forth herein by way of example. Many modifications can be made in the structure disclosed without departing from the basic teaching of this invention. For example, it is not necessary to use the 3/6 or 2/5 codes disclosed herein in every embodiment of the invention; embodiments can be easily designed for any M out of N code by a straightforward adaptation of the structure shown herein. Furthermore, it is not necessary to use the particular cryotron and cryogenic current limiting devices disclosed herein; any suitable cryogenic control devices which accomplish the desired end of selectively introducing resistance into superconductor branches can be employed in other embodiments of this invention. In addition, it is not necessary to use the same current value $I_C$ for every storage conductor or transfer means as shown herein. In some embodiments of the invention the critical current value might differ from one part of the circuit to another, and the transfer means might therefore have one critical current $I_X$ on one set of conductors thereof and a different critical current $I_Y$ on the other set of conductors thereof instead of the common critical current $I_C$ disclosed herein. These and other modifications of the structure disclosed herein will be apparent to those skilled in the art, and this invention includes all modifications falling within the scope of the following claims.

What is claimed is:

1. A cryogenic M out of N information transfer circuit comprising N branches of superconductor material coupled together in parallel, a first current source producing a total current of (N–M) current units coupled to said parallel branches, N cryogenic current control devices each containing a gate current path and a control current path operable at one current unit to make said gate current path resistive, the gate current path of each cryogenic current control device being coupled in series with a corresponding one of said branches of superconductor material, and input means for applying current to the control current paths of a predetermined M of the N cryogenic current control devices in accordance with an M out of N information code.

2. The combination defined in claim 1 and also including N additional cryogenic current control devices each containing a gate current path and a control current path, the gate current path of each additional cryogenic current control device being coupled in series with a corresponding one of said branches of superconductor material, the control current paths of all of said additional cryogenic current control devices being coupled in series with each other, and reset means for applying current to the control current paths of said additional cryogenic current control devices sufficient to make each of the associated gate current paths resistive.

3. The combination defined in claim 1 and also including N cryogenic current limiting devices coupled in series with a corresponding one of said branches of superconductor material, each of said devices being operable to limit the current therethrough to one current unit.

4. A cryogenic M out of N information transfer circuit and (N–M) out of N storage circuit comprising N input superconductor paths of equal inductance coupled in parallel, an input current source for providing a total current of M current units coupled to said input superconductor paths, signal input means for routing one unit of current through each of a predetermined M of the N input superconductor paths in accordance with an M out of N code, N storage superconductor paths of equal inductance coupled in parallel, a storage current source for providing a total of N–M current units coupled to said storage superconductor paths, N cryogenic current control devices each having a gate current path and a control current path operable at one current unit to make said gate current path resistive, the gate current path of each of said cryogenic current control devices being coupled in series with a corresponding one of said storage superconductor paths, and the control current path of each of said cryogenic current control devices being coupled in series with a corresponding one of said input superconductor paths, whereby the application of one unit of current to each of a predetermined M of said N input superconductor paths produces one unit of current on a corresponding (N–M) of said N storage superconductor paths.

5. The combination defined in claim 4 and also including an additional N cryogenic current control devices as defined in claim 4, the gate current path of each of said additional cryogenic current control devices being coupled in series with a corresponding one of said storage superconductor paths, the control current path of all of said additional cryogenic current control devices being coupled in series with each other, and reset current means for applying one unit of current to the control current paths of said additional cryogenic current control devices.

6. The combination defined in claim 4 and also including N cryogenic current limiting devices becoming resistive when the current flow therethrough exceeds one unit, each of said currrent limiting devices being coupled in series with a corresponding one of said storage superconductor paths.

7. The combination defined in claim 6 and also including an additional N cryogenic current limiting devices as defined in claim 6, each coupled in series with a corresponding one of said input superconductor paths.

8. The combination defined in claim 6 and also including an additional N cryogenic current control devices, the control current path of each of said additional N cryogenic current control devices being coupled in series with a corresponding one of said storage superconductor paths whereby the application of one unit of current to each of a predetermined M of said N input superconductor paths produces a resistive state in the gate current path of a corresponding (N–M) of said additional N cryogenic current control devices.

9. The combination defined in claim 4 and also including code input switching means coupled to said cryogenic current input conductors, said code input switching means being adapted to switch current onto a predetermined M of the N current input conductors in accordance with an M out of N code.

10. The combination claimed in claim 3, in which each of said current limiting devices comprises a cryogenic current control device, the gate and control current paths of which are connected in series.

References Cited by the Examiner

UNITED STATES PATENTS

| | | | |
|---|---|---|---|
| 2,995,303 | 8/1961 | Collins | 235—176 |
| 3,019,353 | 1/1962 | Mackay | 307—88.5 |
| 3,069,086 | 12/1962 | Papo | 235—176 |
| 3,077,591 | 2/1963 | Akmenkalns et al. | 340—347 |
| 3,086,197 | 4/1963 | Anderson | 307—88.5 |
| 3,087,149 | 4/1963 | Malcolm | 340—347 |
| 3,135,946 | 6/1964 | Miller et al. | |

ARTHUR GAUSS, *Primary Examiner.*

DARYL W. COOK, *Examiner.*